United States Patent [19]
O'Dell et al.

[11] 3,857,300
[45] Dec. 31, 1974

[54] FOLDING HANDWHEEL HANDLE

[75] Inventors: David L. O'Dell, South Bend; Leo A. Shaffer, Mishawaka, both of Ind.

[73] Assignee: Wheelabrator-Frye Inc., Mishawaka, Ind.

[22] Filed: Jan. 16, 1974

[21] Appl. No.: 433,680

[52] U.S. Cl............................. 74/557, 74/543, 74/547
[51] Int. Cl................................................. G05g 1/10
[58] Field of Search...................... 74/557, 547, 543

[56] References Cited
UNITED STATES PATENTS
1,518,729  12/1924  Burns.................................... 74/547
FOREIGN PATENTS OR APPLICATIONS
825,212  2/1935  France.................................. 74/557
1,139,077  6/1957  France.................................. 74/557

*Primary Examiner*—Samuel Scott
*Assistant Examiner*—F. D. Shoemaker
*Attorney, Agent, or Firm*—Wood, Herron & Evans

[57] ABSTRACT

A folding safety handwheel handle is normally maintained in an inoperative substantially non-projecting position within the concave face of a handwheel. The handle is mounted to the handwheel via a mounting unit which is pressed into the outer circumferential portion of the wheel. The unit is spring loaded to normally bias the handle into its inoperative position but the handle can be grasped and moved outwardly of the wheel to facilitate turning the wheel by hand.

10 Claims, 4 Drawing Figures

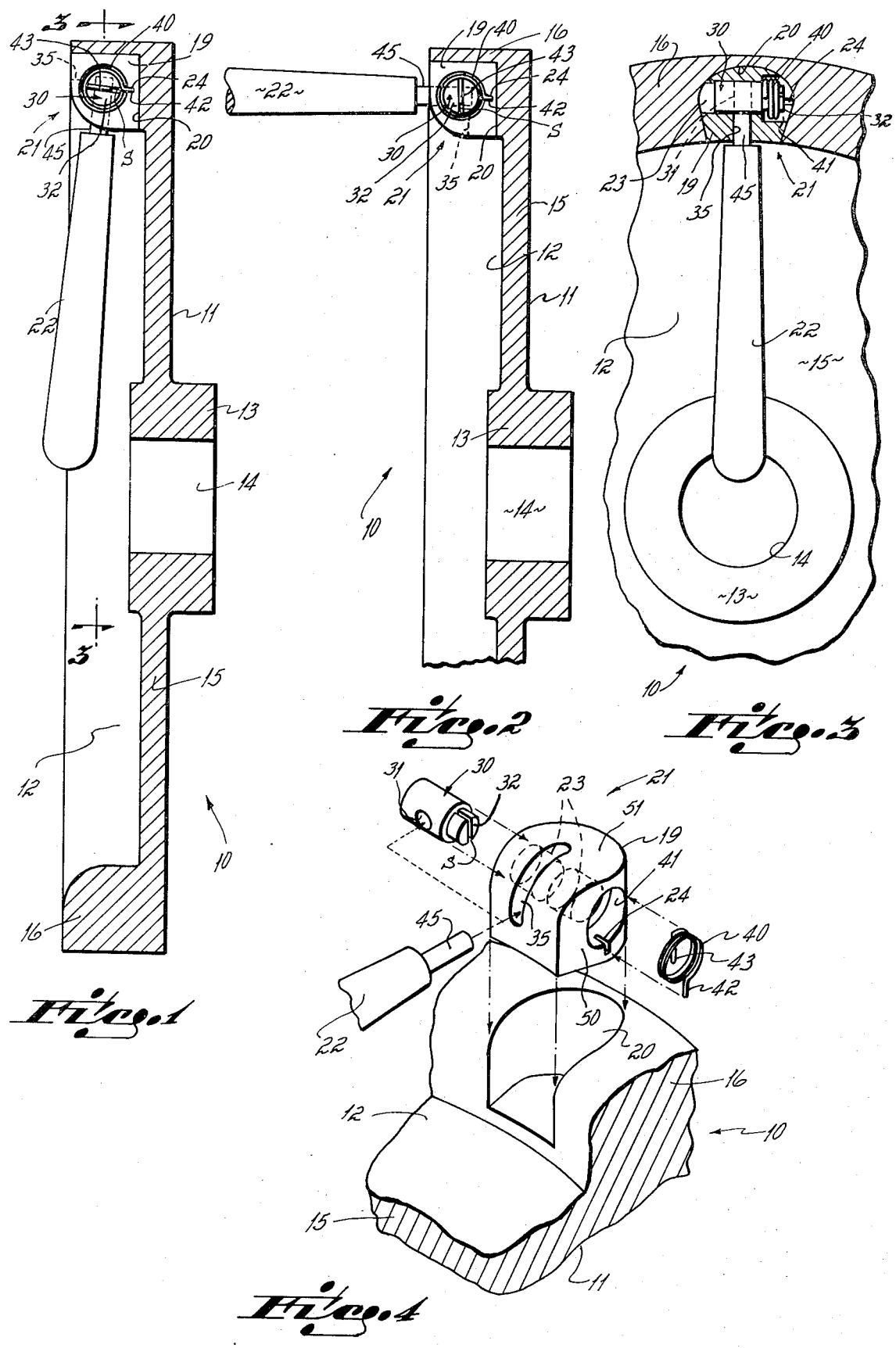

FOLDING HANDWHEEL HANDLE

This invention relates to handwheels and more particularly to folding safety handles and structure for mounting such handles to handwheels.

Handwheels of the type with which this invention is utilized are now industrially used in a great variety of applications. It has been common to provide such wheels with handles which extend outwardly of the wheel to facilitate the turning of the wheel by hand. In some cases, the handles can be folded with respect to the wheel.

In industrial applications, handwheels are frequently caused to turn at high speed by virtue of connection to a rotating part in a machine, for example. It has been found that handles, when protruding from such turning wheels, present a danger to persons in the immediate area. As a result, certain safety standards have been, or are now being, promulgated with respect to handwheels having extensible handles. It is thus apparent that the demand for new handwheels meeting these regulations will increase and applicants desire to provide a novel handle and mounting structure therefor which not only meetings the various safety regulations but can be economically produced.

While a number of mechanisms have been disclosed for attaching folding handles to handwheels, many of these are replete with numerous parts, are obtrusive, and manufacture and assembly thereof is rather complex. Examples of such mechanisms are found, for example, in the many types of automative steering wheel handles popular in days gone by.

Accordingly, it has been one objective of the invention to provide a handwheel having a novel folding handle and attractive mounting structure therefor so that the handle is normally spring biased into an inoperative substantially non-projecting position along one face of the wheel.

A further objective of the invention has been to provide an improved handle and mounting structure subassembly for a handwheel, utilizing a minimum number of parts and being exceptionally simple to manufacture and assemble to a handwheel.

In a preferred embodiment, the invention includes a handwheel having a concave face provided by an outer circumferential portion thicker than the remainder of the wheel, a recess in the thickened portion, and a spring-loaded handle mounting unit adapted to fit within the recess and bias a connected handle into an inoperative position within the concave face of the wheel.

The mounting unit includes a mounting element adapted to frictionally fit within the recess. The element has a bore therethrough and an arbor is disposed within the bore. A coil spring, also within the bore, is attached at one end to the mounting element and is operationally attached at another end to the arbor. A slot is cut into the mounting element transverse to the bore and a transverse hole is provided in the arbor, this hole being aligned with the slot. A handle has a projection on one end thereof and this projection extends through the slot into the hole of the arbor.

This unit is assembled to a handwheel by press-fitting the mounting element into the recess in the wheel. The relationship of the spring, the arbor and the mounting element is such that the spring rotationally biases the arbor so that the handle projection is urged against one end of the slot. In this position, the major portion of the handle, as in FIG. 1 lies within the concave face of the wheel and does not project therefrom enough to be dangerous to nearby persons. It can be grasped, however, and pivoted into a transverse position with respect to the wheel to facilitate turning of the wheel by hand. When released, the handle is automatically returned to its inoperable position by the spring. A spring detent can be used to further maintain the handle in its inoperative position.

The invention thus provides a novel folding safety handle for a handwheel; it is made from a minimum number of parts and is easily and economically manufactured and assembled.

These and other advantages will become readily apparent from the following detailed description and drawings in which:

FIG. 1 is a cross-sectional view of a handwheel according to the invention, the handle being shown in an inoperative position;

FIG. 2 is a cross-sectional view similar to FIG. 1, except that the handle is shown in an operative position;

FIG. 3 is a cross-sectional view taken along lines 3—3 of FIG. 1; and

FIG. 4 is an exploded isometric view of the handle mounting unit.

Referring now specifically to the drawings, a handwheel 10 is illustrated in FIG. 1. The handwheel has a rear face 11 and a forward concave face 12. A hub 13, having a bore 14, is centrally located in the handwheel and the handwheel is thereby adapted for normal use in connection with, for example, industrial machinery controls or the like. The rear and forward faces 11 and 12 are defined by a web 15 extending radially about the hub 13. The handwheel is circumferentially provided with an outer circumferential portion 16 which has a greater thickness than the web 15 and thereby forms the concave forward face 12 of the wheel as shown.

As shown in FIG. 4, a recess 20 is formed in the outer circumferential portion of the wheel 10 and a handle mounting unit 21 is adapted to fit within the recess so as to pivotally mount a handle 22 to the wheel. The handle mounting unit 21 includes a mounting element 19 having a bore 23 therethrough. A slot 24 is provided in the bore for a purpose as will be explained.

An arbor 30 is rotationally disposed in bore 23. The arbor is provided with a transverse bore 31 and further includes projections 32 extending from one end thereof so that the projections form a slot S therebetween as will be discussed.

In addition to the bore 23 the mounting element 19 also includes a slot 35 which is cut into the mounting element transversely to the bore 23. When the arbor 30 is placed within the bore 23, the bore 31 in the arbor is aligned with the transverse slot 35.

A coil spring 40 is also disposed within the mounting element and lies in an extension 41 of the bore 23. The extension 41 has a slightly larger diameter than the bore 23 as best seen in FIG. 3. The coil spring 40 has two ends 42 and 43. The end 42 is attached to the mounting element 19 by virtue of the fact that it is placed within the slot 24 (which is also in the enlarged bore portion 41). The end 43 of the coil spring is operationally disposed within the slot S formed by the projections 32 of the arbor 30. Thus, it can be appreciated that the coil spring resists rotational movement of the arbor in a clockwise direction (as shown in FIG. 1). The handle 22 includes a projection 45 and this projection extends through the transverse slot 35 into the transverse bore 31 in the arbor 30. By this construction, the coil spring is operable to bias the handle into a desired position.

Once the mounting element, the arbor, the spring, and the handle have been formed, these parts can be easily assembled together and thereafter easily assembled to the handwheel. It is only necessary to fit the arbor and the coil spring into the bore 23 in the manner described and thereafter place the handle extension 45 through the transverse slot 35 into the bore 31 of the arbor. This sub-assembly is thereafter attached to the handwheel by merely pressing the mounting element into the recess 20 of the wheel.

The mounting element has external surfaces 50 which have a configuration similar to that of the recess 20 so that the element is frictionally but securely attached to the wheel. As can be particularly appreciated from FIGS. 3 and 4, a mounting element 19 includes further external surfaces, such as at 51, which particularly conform to the external shape of the outer circumferential portion 16. In this manner, the mounting element 19 blends in very attractively with the wheel.

Once the mounting element and all of its parts as described have been press fitted into the recess 20, the wheel is ready for use. When it is desired to turn the wheel, the handle, which normally lies in an inoperative position as shown in FIG. 1, can be grasped and moved to its position as shown in FIG. 2 to facilitate turning the wheel by hand. Movement of the handle in this manner causes rotation of the arbor 30 against the bias of the coil spring 40, and the handle in its extended position as shown in FIG. 2 is thus continually biased toward its inoperative position as shown in FIGS. 1 and 3.

When the handle 22 is released, the coil spring rotationally biases the arbor and thereby the handle back to its inoperative position. In this inoperative position, it can be seen, particularly with respect to FIG. 1, that the handle 22 lies substantially within the concave face 12 of the wheel 10 and extends outwardly of the wheel a maximum of about ½ inch. Of course, this projection can vary according to the structure of the wheel and of the handle so that the handle could lie completely within the wheel. This provides an added safety factor in that when the wheel is caused to turn as by rotation of a member to which it is connected, there is no circumferential projection from the wheel which could hit and injure someone in the immediate vicinity, rather the handle lies substantially within the wheel with only a small portion extending outwardly thereof; and that on the approximate axis of wheel rotation.

From the foregoing it can be appreciated that the invention provides a highly unique folding safety handle and handle mounting unit for a handwheel. The complete unit is made from a minimum number of parts and can be very economically and easily manufactured and assembled to form an attractive and safe handwheel. Of course, it is to be appreciated that such elements as the particular spring means, the shape of the arbor, the shape of the handle and its extension, and the configuration of the bore through the mounting element, as well as other features might all be modified without departing from the scope of this invention.

It is thus to be appreciated that those of ordinary skill in the art will readily recognize these and other modifications and alternations, without departing from the scope of the invention, and applicants intend to be bound only by the following claims.

We claim:

1. In combination, a folding safety handle and a handwheel comprising:
    a handwheel having an outer face with an outer circumferential portion and a recess therein,
    a handle mounting element adapted to be secured in said recess, said element having a bore and a slot transverse to said bore,
    an arbor disposed in said bore and rotatable therein,
    a handle and extension means for connecting said handle to said arbor, said extension means passing through said slot and into said arbor, and
    spring means connected between said arbor and said mounting element for biasing said handle into an inoperative position along the outer face of said handwheel.

2. A folding safety handle for a handwheel as in claim 1 wherein said outer face of said handwheel is concave, the outer circumferential portion being thicker than internal portions of the wheel so that said handle, when in inoperative position, lies substantially within said wheel.

3. A folding safety handle for a handwheel as in claim 1 wherein said spring means is a coil spring, one end of which is secured to said mounting element and another end of which is secured to said arbor.

4. A folding safety handle for a handwheel as in claim 3 wherein said arbor includes means on one end for engaging said spring, said arbor being shorter than the length of said bore in the mounting element and said spring being disposed adjacent said one end of said arbor in said bore.

5. A folding safety handle for a handwheel as in claim 1 wherein said arbor has a transverse bore therein for receiving said handle extension.

6. A folding safety handle for a handwheel as in claim 1 wherein the mounting element is pressed into said recess after said arbor is placed in said bore, said mounting element having external surfaces which conform to the shape of said outer circumferential portion of said wheel.

7. A folding safety handle for a handwheel as in claim 1 wherein said extension means comprises a cylindrical element projecting from an end of said handle.

8. A folding safety handle for a handwheel as in claim 1 wherein one end of said bore has an enlarged diameter for receiving said spring means.

9. A handle mounting unit adapted for use with a handwheel having a recess in an outer circumferential portion thereof, comprising:
    a mounting element having external surfaces conforming to the surfaces of said recess so that said mounting element can be press-fitted and frictionally held therein,
    a bore in said mounting element and a slot transverse to and connecting with said bore,
    a rotatable arbor disposed within said bore, said arbor having a transverse bore aligned with said slot,
    a coil spring, in said mounting element bore, adjacent an end of said arbor, one end of said spring attached to said element and another end attached to said arbor, and a handle having an extension extending through said slot into the bore in the arbor, said spring being operable to rotationally bias said arbor so that said handle extension engages one end of said slot.

10. Handle mounting structure as in claim 9 wherein said mounting element has other external surfaces conforming to the shape of said circumferential portion.

* * * * *